United States Patent [19]

Wright

[11] Patent Number: 4,574,832
[45] Date of Patent: Mar. 11, 1986

[54] FLOAT LEVEL ADJUSTMENT MEANS
[75] Inventor: Peter S. Wright, St. Mary's, Australia
[73] Assignee: F. F. Seeley Nominees Pty. Ltd., St. Mary's, Australia
[21] Appl. No.: 760,702
[22] Filed: Jul. 30, 1985
[30] Foreign Application Priority Data Aug. 1, 1984 [AU] Australia ............................. PG6334

[51] Int. Cl.$^4$ ....................... F16K 31/18; F16K 33/00
[52] U.S. Cl. .................................. 137/426; 73/322.5; 137/434
[58] Field of Search ............... 137/426, 434, 442, 443, 137/444, 446, 448; 4/391, 395, 403; 73/322.5

[56] References Cited

U.S. PATENT DOCUMENTS

| 1,972,331 | 9/1934 | Dean | 137/426 |
| 2,009,284 | 7/1935 | Warner | 73/322.5 |
| 2,827,916 | 3/1958 | Manchester | 137/443 |
| 2,847,025 | 8/1958 | Reitman | 137/426 |
| 3,004,748 | 10/1961 | Sprouse et al. | 137/426 |
| 3,331,387 | 7/1967 | Walters | 137/426 |
| 3,987,813 | 10/1976 | Leczycki | 137/426 |

FOREIGN PATENT DOCUMENTS 413352 7/1934 United Kingdom ................ 137/426

Primary Examiner—G. L. Walton
Attorney, Agent, or Firm—Townsend and Townsend

[57] ABSTRACT

Adjustment means for a valve float assembly comprising a float arm and a float, the float having a circular side wall with a flange outstanding from it and extending around it helically, the float arm end having flange engaging surfaces slidable over the flange so that rotation of the float raises or lowers it to provide the level adjustment means, and thereby water level height adjustment means.

5 Claims, 3 Drawing Figures

FLOAT LEVEL ADJUSTMENT MEANS

This invention relates to adjustment means for the adjustment of a float of the type which is used to control opening and closing of a valve in a cistern.

BACKGROUND OF THE INVENTION

In many applications of float valves, and particularly where such valves are used in evaporative coolers, there is a need to adjust the height of water level, and this is normally achieved by adjusting the effective height of a float with respect to its valve. If a valve arm is formed from metal this is sometimes achieved by bending the metal, but such a method is not available if the valve arm is formed from plastics material.

The main object of this invention is to provide improvements whereby float level can be easily adjusted, without the need for expensive adjustment means.

BRIEF DESCRIPTION OF THE INVENTION

In one embodiment of this invention level adjustment means for a valve float assembly comprises a float arm and a float, the float having a circular side wall with a flange outstanding from it and extending around it helically, the float arm end having flange engaging surfaces slidable over the flange so that rotation of the float raises or lowers it to provide the level adjustment means, and thereby water level adjustment means.

More specifically, level adjustment means comprise a circular float having aside wall, a flange outstanding radially from, and extending helically at least partway around the side wall, axially extending support surfaces on the flange, a float arm having flange engaging surfaces at one end and valve engaging means at the other, the flange engaging surfaces of the arm slidably engaging said flange support surfaces of the float so that, upon rotation of the float, the float moves in an axial direction with respect to the arm.

BRIEF DESCRIPTION OF THE DRAWINGS

An embodiment of the invention is described hereunder in some detail with reference to, and is illustrated in, the accompanying drawings, in which.

Figure 3:
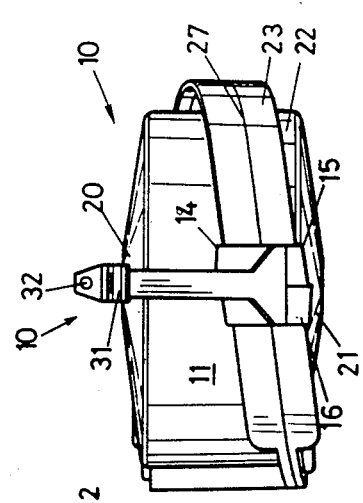
FIG. 3 is an end elevation of FIG. 2.
Figure 1:
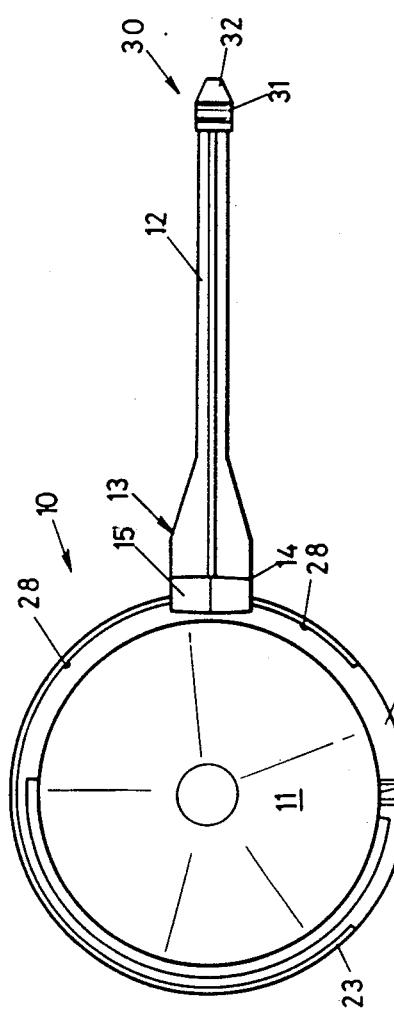
FIG. 1 is a top view of a valve float assembly.
Figure 2:
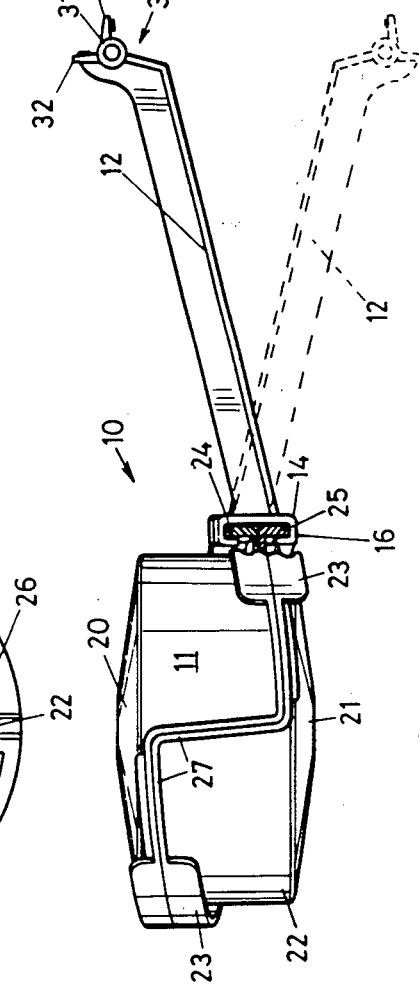
FIG. 2 is a side elevation of same.

In this embodiment a valve float assembly 10 comprises a float 11 and a float arm 12.

One end 13 of the float arm 12 is provided with a C-section hook plate 14 having upper and lower hooks 15 and 16 which extend for a short distance laterally and provide flange engaging surfaces. Float 11 comprises convex upper end and base closure walls 20 and 21, and a circular side wall 22 connecting the closure walls. The circular side wall 22 is provided with an outstanding T-flange 23, having flange portions 24 and 25 which extend above and below a central web portion 26 extending from the circular side wall 22. The dimensions of the flange are such that the C-section hook plate will firmly but slidably engage the flange portions 24 and 25, which partly surround the side wall 22 in a helical manner so that rotation of the float will cause raising or lowering of the float with respect to the C-section hook plate 14, in turn causing raising or lowering of water level in a cistern containing a valve controlled by the float assembly 10.

In the illustrated embodiment, float 10, together with its helical T-flange 23, comprises two identical half-float mouldings which are joined along helically and axially extending portions by a cement join 27 which bisects flange 23. Since the flange 23 is discontinuous the C-section hook plate can be positioned over it from either one of its ends. Axially extending ribs 28 restrain, but do not prevent, rotation of the float 11 with respect to its arm 12, and this feature improves security against possible loss of adjustment.

The end 30 of the arm 12 is provided with an apertured boss 31 by which it engages a valve (not shown), and a pair of actuating tabs 32, one of which, upon hinging of arm 12, will actuate a valve member. As shown in dotted lines, the arm 12 can be inverted, and this feature, combined with a selection of actuating tab 32, affords alternative mounting arrangements which can be useful in different valve installations.

The claims defining the above invention are claimed as follows:

1. Level adjustment means for a valve float assembly comprising a float and a float arm comprising:
    a circular float side wall, a flange outstanding radially from, and extending helically at least partway around the side wall, axially extending support surfaces on the flange,
    and a float arm having flange engaging surfaces at one end and valve engaging means at the other,
    the flange engaging surfaces of the arm slidably engaging said flange support surfaces of the float so that, upon rotation of the float relative to the float arm, the float arm is adjustably positioned along the flange support surfaces and thereby moves the float in an axial direction with respect to the float arm to define different fluid levels.

2. Level adjustment means according to claim 1 wherein said flange has a T-shaped cross-section and said one end of the float arm comprises a C-section hook plate which engages over portion of the flange.

3. Level adjustment means according to claim 2 wherein said float comprises two identical mouldings adhered together by a cement join which bisects the T-section flange.

4. Level adjustment means according to claim 1 further comprising a plurality of ribs spaced from one another around the flange and projecting outwardly from a support surface thereof, the ribs being of such dimension as to restrain but not prevent said rotation of the float.

5. Level adjustment means according to claim 1 wherein said valve engaging means of the float arm comprise an apertured boss and actuating tabs outstanding therefrom.

* * * * *